United States Patent
Yun et al.

(10) Patent No.: US 10,630,597 B2
(45) Date of Patent: Apr. 21, 2020

(54) AGGREGATE INTERFACE INCLUDING MILLIMETER-WAVE INTERFACE AND WIRELESS LOCAL AREA NETWORK INTERFACE

(71) Applicant: Hewlett Packard Enterprise Development LP, Houston, TX (US)

(72) Inventors: Sangki Yun, Palo Alto, CA (US); Kyu-Han Kim, Palo Alto, CA (US); Wenguang Mao, Palo Alto, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 15/904,024

(22) Filed: Feb. 23, 2018

(65) Prior Publication Data

US 2019/0268275 A1    Aug. 29, 2019

(51) Int. Cl.
| | |
|---|---|
| *H04L 12/801* | (2013.01) |
| *H04W 76/16* | (2018.01) |
| *H04W 72/12* | (2009.01) |
| *H04L 12/861* | (2013.01) |
| *H04W 84/12* | (2009.01) |
| *H04L 12/709* | (2013.01) |

(52) U.S. Cl.
CPC .......... *H04L 47/34* (2013.01); *H04L 49/9057* (2013.01); *H04W 72/1215* (2013.01); *H04W 76/16* (2018.02); *H04L 45/245* (2013.01); *H04W 84/12* (2013.01)

(58) Field of Classification Search
CPC ............................ H04W 28/06; H04L 47/34
See application file for complete search history.

(56) References Cited

U.S. PATENT DOCUMENTS

| | | | |
|---|---|---|---|
| 6,229,788 B1 * | 5/2001 | Graves | H04L 49/205 370/230 |
| 7,912,506 B2 | 3/2011 | Lovberg et al. | |
| 9,603,055 B2 | 3/2017 | Forssell et al. | |
| 9,736,699 B1 * | 8/2017 | Rao | H04W 16/14 |

(Continued)

FOREIGN PATENT DOCUMENTS

WO    WO-2017171896    10/2017

OTHER PUBLICATIONS

CES: First 802.11ad 60GHz Wi-Fi router unveiled by TP-Link, (Research Paper), Jan. 6, 2016, 17 Pgs.

(Continued)

*Primary Examiner* — Melanie Jagannathan
(74) *Attorney, Agent, or Firm* — Brooks, Cameron & Huebsch, PLLC

(57) ABSTRACT

In some examples, a system for an aggregate interface including a mmWave interface and a WLAN interface consistent with the disclosure includes a sending device to assign a plurality of frames to the WLAN interface and the mmWave interface and send the plurality of frames in a sequence via an aggregate interface, where the aggregate interface includes the WLAN interface and the mmWave interface. Additionally, the system includes a receiving device communicatively coupled to the sending device to determine the plurality of frames is received in a different sequence than the sequence the plurality of frames is sent by the sending device and place the plurality of frames in the sequence the plurality of frames is sent by the sending device.

20 Claims, 3 Drawing Sheets

(56) References Cited

U.S. PATENT DOCUMENTS

| | | | |
|---|---|---|---|
| 9,807,035 B1* | 10/2017 | Hanks | H04L 49/25 |
| 2004/0001512 A1* | 1/2004 | Challener | H04L 47/15 |
| | | | 370/468 |
| 2006/0039285 A1* | 2/2006 | Chapman | H04L 47/10 |
| | | | 370/235 |
| 2007/0133548 A1* | 6/2007 | Kim | H04L 45/00 |
| | | | 370/392 |
| 2010/0081451 A1* | 4/2010 | Mueck | G01S 5/0045 |
| | | | 455/456.1 |
| 2015/0055562 A1 | 2/2015 | Shulman et al. | |
| 2015/0264699 A1* | 9/2015 | Fwu | H04L 5/003 |
| | | | 370/329 |
| 2015/0280972 A1* | 10/2015 | Sivan | H04L 41/0668 |
| | | | 370/225 |
| 2017/0325124 A1* | 11/2017 | Mitra | H04W 28/06 |

OTHER PUBLICATIONS

Lim et al., "Design, Implementation, and Evaluation of Energy-Aware Multi-Path TCP", Proceedings of the 11th ACM Conference on Emerging Networking Experiments and Technologies, 2015, 13 pages.

Nikravesh et al., "An In-depth Understanding of Multipath TCP on Mobile Devices: Measurement and System Design", ACM MobiCom, 2016, pp. 189-201.

Sur et al., "WiFi-Assisted 60 GHz Wireless Networks", Proceedings of the 23rd Annual International Conference on Mobile Computing and Networking, 2017, 14 pages.

* cited by examiner

AGGREGATE INTERFACE INCLUDING MILLIMETER-WAVE INTERFACE AND WIRELESS LOCAL AREA NETWORK INTERFACE

BACKGROUND

Wireless electromagnetic waves can be transmitted on different frequency bands, including but not limited to, Very High Frequency (VHF) band that has a frequency range of 30 MHz to 300 MHz, Ultra High Frequency (UHF) that has a frequency range of 300 MHz to 3 GHz, and Super High Frequency (SHF) that has a frequency range of 3 GHz to 3 GHz.

DETAILED DESCRIPTION

Figure 1:
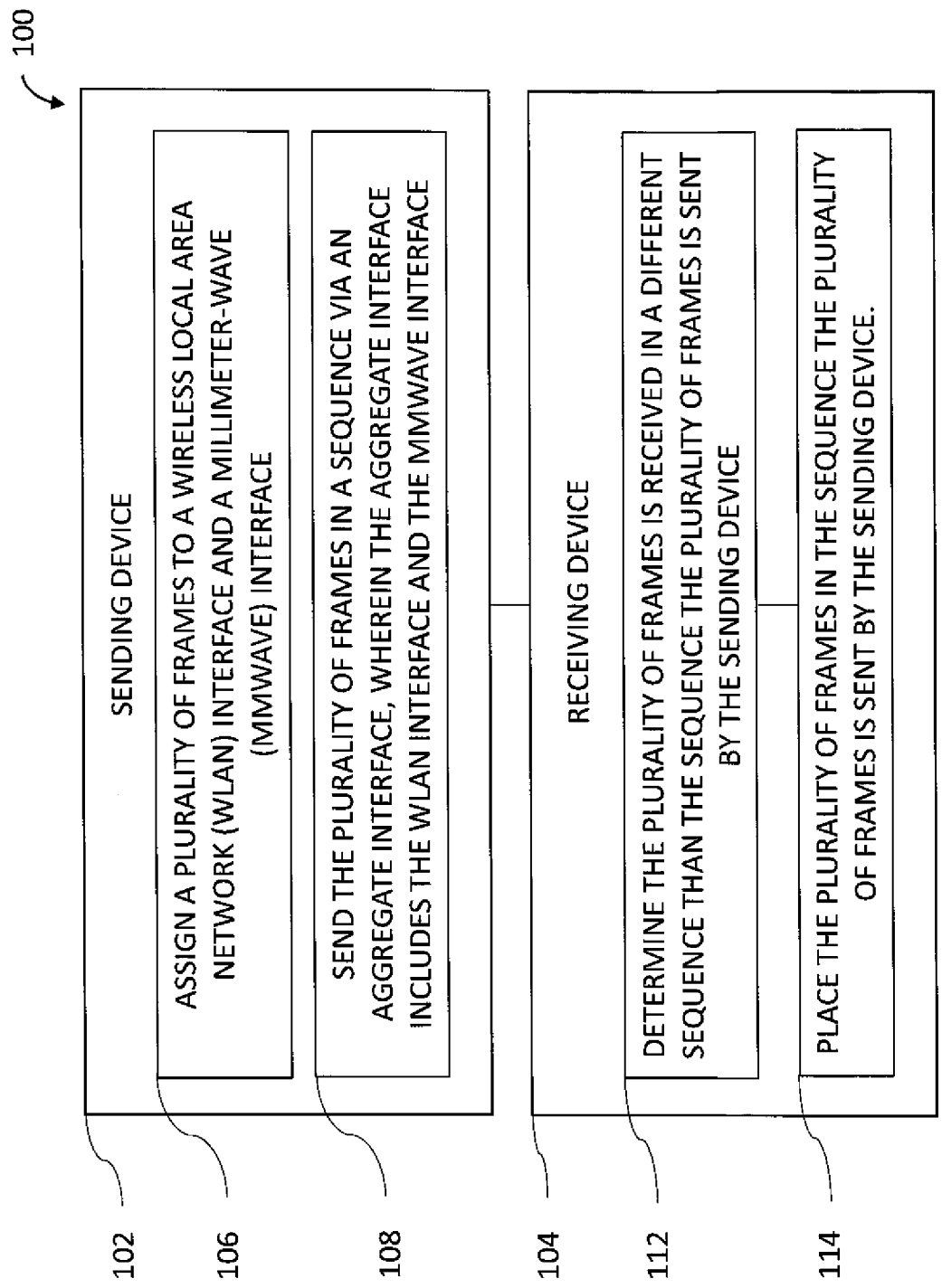
FIG. 1 illustrates an example of a system for an aggregate interface including a millimeter-wave (mmWave) interface and a wireless local area network (WLAN) interface consistent with the disclosure.

Global demand for mobile data continues to congest wireless data networks. The channels on the radio frequency spectrum under 6 Gigahertz (GHz) as currently utilized by WLANs are becoming crowded. On the other hand, there is multi-GHz of available spectrum at the mmWave frequency band between 30 GHz and 300 GHz. For example, there are 7 GHz of unlicensed spectrum at the 60 GHZ mmWave frequency band. Further, multiple standardization efforts, such as IEEE 802.11 ad, 802.15.3c, and/or European Computer Manufacturers Association (ECMA), and other products operating on the 60 GHz mmWave spectrum may offer 7 Gigabits (Gbps) of wireless bitrate.

mmWaves may differ from WLAN signal waves. mmWaves may have a relatively shorter wavelength than a WLAN signal wavelength. For example, the mmWaves may have a wavelength of one to ten millimeters (mm). At 60 GHz, the mmWaves may have a wavelength of five mm. In contrast, a WLAN signal may have a wavelength in the tens of millimeters. For example, at 2.4 GHz the wavelength may be 12.5 centimeters (cm) and at 5 GHz the wavelength may be 6 cm.

mmWaves are susceptible to channel propagation loss by, among other factors, atmospheric attenuation. The relatively higher frequency and relatively shorter wavelength of the mmWave versus a Wi-Fi signal may render the mmWave relatively more vulnerable to channel propagation loss than Wi-Fi signals. In one example, a 60 GHz mmWave data transfer link may suffer from 2.6 decibels (dB) higher signal path loss than compared to a 5 GHz Wi-Fi signal under the same environmental conditions.

Signal path loss may degrade and/or interrupt the transfer of data. For example, if an access point (AP) utilizes mmWaves to transfer data to and/or from a client device associated with the AP, then signal path loss between the two may interrupt the transfer of data. As used herein, the term "access point" or "AP", can, for example, refer to a networking device that allows a client device to connect to a wired or wireless network. An AP can include a processor, a memory, and/or input/output interfaces, including wired network interfaces such as IEEE 802.3 Ethernet interfaces, as well as wireless interface such as IEEE 802.11 wireless interfaces, although examples of the disclosure are not limited to such interfaces. An AP can include memory, including read-write memory, and a hierarch of persistent memory such as ROM, EPROM, and Flash Memory.

As used herein, AP generally refers to receiving points for any known or convenient wireless access technology which may later become known. Specifically, the term AP is not intended to be limited to IEEE 802.11-based APs. APs generally function as an electronic device that is adapted to allow wireless communication devices to connect to a wired network via various communication standards.

As used herein, the term "client device" can, for example, refer to a device including a processor, memory, and input/output interfaces for wired and/or wireless communication. A client device may include a laptop computer, a desktop computer, a mobile device, and/or other wireless devices, although examples of the disclosure are not limited to such devices. A mobile device may refer to devices that are (or may be) carried and/or worn by a user. For instance, a mobile device can be a phone (e.g., a smart phone), a tablet, a personal digital assistant (PDA), smart glasses, and/or a worn device (e.g., a smart watch) among other types of mobile devices.

Accordingly, the disclosure is directed to an aggregate interface including a mmWave interface and a WLAN interface consistent with the disclosure. A cross-layer approach may leverage both the WLAN link and the mmWave link to achieve the robustness of WLAN link and high speed of the mmWave link simultaneously. For instance, transmitting frames using the aggregate interface including the WLAN interface and the mmWave interface may include sending, from a sending device to a receiving device, a plurality of frames in a sequence via the aggregate interface. Further, transmitting frames using the aggregate interface including the WLAN interface and the mmWave interface may include determining, by the receiving device, the plurality of frames is received in a different sequence than the sequence the plurality of frames is sent by the sending device.

FIG. 1 illustrates an example system 100 for an aggregate interface including a mmWave interface and a WLAN interface consistent with the disclosure. The system 100 is not limited to a particular example described herein and may include additional features such as those described in the non-transitory machine-readable storage medium 210 described in FIG. 2 and/or the method 320 described in FIG. 3.

Both sending device 102 and receiving device 104 can include a processing resource. Sending device 102 and receiving device 104 may further include a memory resource coupled to the processing resource, on which instructions may be stored, such as instructions 106, 108, 112, and 114. In some examples, the instructions may be distributed (e.g., stored) across multiple memory resources and the instructions may be distributed (e.g., executed by) across multiple processing resources.

The processing resource may be a central processing unit (CPU), a semiconductor-based microprocessor, and/or other hardware devices suitable for retrieval and execution of instructions stored in memory resource. The processing resource may fetch, decode, and execute instructions 106, 108, 112, and 114, or a combination thereof. As an alternative or in addition to retrieving and executing instructions, the processing resource may include at least one electronic circuit that includes electronic components for performing the functionality of instructions 106, 108, 112, and 114, or a combination thereof.

The memory resource can be volatile or nonvolatile memory. The memory resource can also be removable (e.g., portable) memory, or non-removable (e.g., internal) memory. For example, memory resource 104 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM), flash memory, a laser disc, a digital versatile disk (DVD) or other optical disk storage, and/or a magnetic medium such as magnetic cassettes, tapes, or disks, among other types of memory.

Instructions 106, when executed by the processing resource, can cause sending device 102 to assign a plurality of frames to a WLAN interface and a mmWave interface. Assigning the plurality of frames to the WLAN interface and the mmWave interface may include monitoring the available bandwidth of the WLAN link and the mmWave link. Monitoring the available bandwidth of the WLAN interface and the mmWave interface may include separately monitoring the WLAN throughput and the mmWave throughput in an aggregated link using a wireless device monitoring application, such as wavemon. The wireless device monitoring application may monitor signal and noise levels, packet statistics, device configuration, and network parameters of wireless network hardware.

Monitoring the available bandwidth of the WLAN link and the mmWave link may include during a time period (e.g., 60 milliseconds (ms)), monitoring a buffer length of the WLAN interface and the mmWave interface. The buffer length of the WLAN interface may be the number of packets temporarily stored in a WLAN interface buffer for transmission through the WLAN interface, while the buffer length of the mmWave interface may be the number of packets temporarily stored in a mmWave interface buffer for transmission through the mmWave interface. The probability that the WLAN buffer length is shorter than a WLAN buffer length threshold may be calculated. If the probability that the WLAN buffer length is shorter than the WLAN buffer length is lower than a predetermined threshold, the WLAN link may be saturated (e.g., all available bandwidth is used). Likewise, the probability that the mmWave buffer length is shorter than a mmWave buffer length threshold may be calculated. If the probability that the mmWave buffer length is shorter than the mmWave buffer length is lower than a predetermined threshold, the mmWave link may be saturated.

Based on a determination that the WLAN link and/or the mmWave link is saturated, the available bandwidth of the WLAN link and the mmWave link may be estimated. During the buffer monitoring period, the total bytes of frames delivered by the WLAN interface and the mmWave interface may be counted. If a link is determined to be saturated, a WLAN link throughput and/or a mmWave link throughput may be calculated by dividing the total bytes of a frame by the duration of the monitoring period. The WLAN link throughput and/or the mmWave link throughput may represent an amount of data that can be achieved by the link, where an impact of spectrum sharing and frame losses may be reflected. Frames may be assigned to the WLAN interface and the mmWave interface based on the available throughput of the WLAN link and the available mmWave link.

The frame buffers (e.g., the WLAN interface buffer and the mmWave interface buffer) can be continuously (e.g., without breaks) monitored to ensure both the WLAN interface and the mmWave interface are utilized. In some instances, if either the WLAN link or the mmWave link becomes under-utilized, the assignment of the frames to the interfaces may be adjusted dynamically. The WLAN link and/or the mmWave link may become under-utilized as a result of either the bandwidth of the WLAN link or the mmWave link decreasing and/or another link gains available bandwidth. For example, if the observed throughput of the WLAN link and the mmWave link are 500 Mbps and 1.5 Gbps, respectively, frames can be assigned to the WLAN interface and the mmWave interface at a 1:3 ratio. If the available WLAN bandwidth reduces to 300 Mbps, under-utilization of the mmWave link may result as well as a decrease in the throughput of the WLAN link. The frames may be reassigned so that utilization of both the WLAN interface and the mmWave interface may be increased.

Instructions 108, when executed by the processing resource, can cause the sending device 102 to send the plurality of frames in a sequence via an aggregate interface, wherein the aggregate interface includes the WLAN interface and the mmWave interface. The aggregate interface bundles multiple interfaces, such as the mmWave interface and the WLAN interface, into a single interface for redundancy and bandwidth aggregation.

Sending device 102 may assign a label to each of the plurality of frames between an internet protocol (IP) and media access control (MAC) header. The label can include a 16-bit sequence number field. The sequence number may be maintained by a bonding driver of a transmitter, which may encapsulate the sequence number header to each of the plurality of frames. The sequence number assigned to each frame sent by sending device 102 may correspond to the sequence that the plurality of frames is sent by sending device 102. For example, in an instance where there are four frames sent by sending device 102, the first frame sent by sending device 102 may be assigned a sequence number that corresponds to being sent first relative to the other frames (e.g., frames two, three, and four).

Instructions 112, when executed by the processing resource, can cause the receiving device 104 to determine the plurality of frames is received in a different sequence than the sequence the plurality of frames is sent by sending device 102. Receiving device 104 may be communicatively coupled to sending device 102. Receiving device 104 may be a client device, such as a mobile device. Assigning frames to the mmWave interface and the WLAN interface can result in an out-of-order delivery of frames from sending device 102 to receiving device 104 due to the mmWave transmission being faster than the WLAN transmission.

Receiving device 104 may include a bonding driver that may re-order the sequence of the plurality of received frames in a link-layer to ensure the plurality of received frames are in the sequence the plurality of frames was sent by sending device 102 before delivering the frames to an upper-layer of receiving device 104.

The plurality of frames may be delivered to the bonding driver through the WLAN interface and/or the mmWave interface. The bonding driver may determine whether the plurality of frames is received in a different sequence than the sequence the plurality of frames is sent by sending device 102. For instance, if the bonding driver determines, based on the sequence number, that a frame is missing, the bonding driver may store the plurality of received frames until the missing frame is delivered.

Instructions 114, when executed by the processing resource, can cause receiving device 104 to place the plurality of frames in the sequence the plurality of frames is sent by sending device 102. Given the sequence of the plurality of frames, if receiving device 104 determines that a frame is missing, each frame subsequent to the missing frame is stored by a buffer within the bonding driver. Upon delivery of the missing frame, the missing frame and each of the subsequently delivered frames that is stored in the buffer may be sent to an upper layer in the sequence sent by sending device 102.

For example, if receiving device 104 receives frames 1 through 4, receiving device 104 can ensure each of the received frames arrived in the sequence sent by sending device 102 and deliver each of the frames to the upper layer of receiving device 104 without re-ordering frames 1 through 4. However, if frame 6 is received, but not frame 5, receiving device 104 may consider that frame 5 will be received after frame 6. In response to determining that frame 5 is missing, the buffer may store the missing sequence number. The buffer may store each of the subsequently received frames until the missing sequence number is detected. Detection of the missing sequence number may indicate that the missing frame is received. Additionally, the buffer may place the plurality of stored frames in the sequence sent by sending device 102.

In response to receiving the missing frame, the buffer may send the plurality of frames in the sequence the plurality of frames is sent by sending device 102 to the upper layer of receiving device 104. For instance, the buffer may send the missing frame and the plurality of stored frames to the upper layer of receiving device 104 in the sequence that the plurality of frames is sent by sending device 102.

Figure 2:
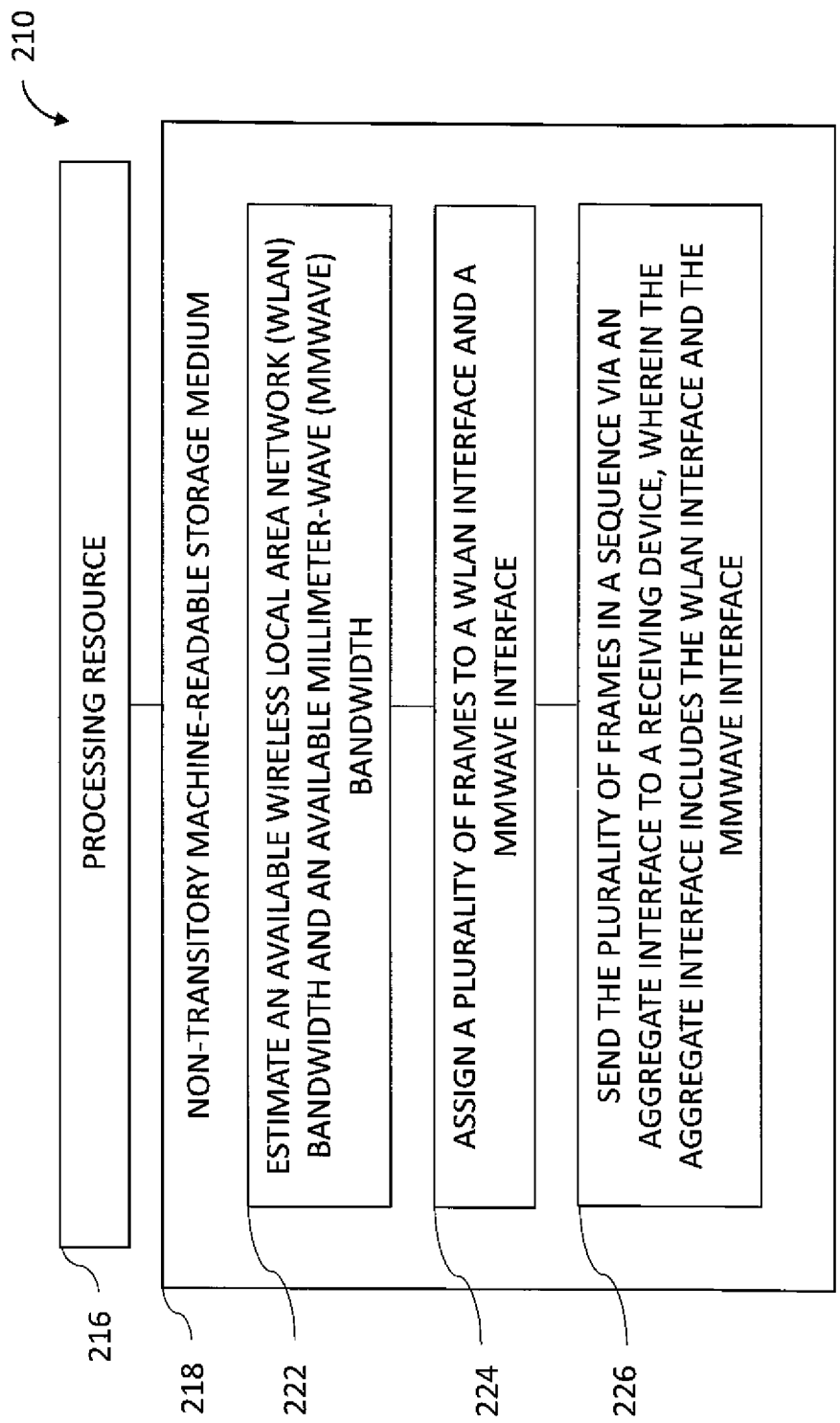
FIG. 2 illustrates an example of a diagram of a processing resource and a non-transitory machine-readable medium for an aggregate interface including a mmWave interface and a WLAN interface consistent with the disclosure.

FIG. 2 illustrates a diagram 210 of a processing resource 216 and a non-transitory machine-readable medium 218 for an aggregate interface including a mmWave interface and a WLAN interface consistent with the disclosure. A memory resource, such as the non-transitory machine-readable medium 218, may be used to store instructions (e.g., 222, 224, 226) executed by the processing resource 216 to perform the operations as described herein. The operations are not limited to a particular example described herein and may include additional operations such as those described in the system 100 described in FIG. 1 and the method 320 described in FIG. 3.

A processing resource 216 may execute instructions stored on the non-transitory machine-readable medium 218. The non-transitory machine-readable medium 218 may be any type of volatile or non-volatile memory or storage, such as random access memory (RAM), flash memory, read-only memory (ROM), storage volumes, a hard disk, or a combination thereof.

The machine-readable medium 218 may store instructions 222 executable by the processing resource 216 to estimate an available WLAN bandwidth and an available mmWave bandwidth. A sending device, such as an AP, may estimate the available WLAN bandwidth and the available mmWave bandwidth. As described herein, a buffer length of the WLAN interface and the mmWave interface may be monitored for a time period, such as 60 ms. The probability that the WLAN buffer length is shorter than a WLAN buffer length threshold may be calculated. If the probability that the WLAN buffer length is shorter than the WLAN buffer length is lower than a predetermined threshold, the WLAN link may be saturated. Likewise, the probability that the mmWave buffer length is shorter than a mmWave buffer length threshold may be calculated. If the probability that the mmWave buffer length is shorter than the mmWave buffer length is lower than a predetermined threshold, the mmWave link may be saturated.

In response to a determination that the WLAN link and/or a the mmWave link is saturated, the available bandwidth of the WLAN link and the mmWave link may be estimated. If a link is determined to be saturated, a WLAN link throughput and/or a mmWave link throughput may be calculated by dividing the total bytes of a frame by the duration of the monitoring period.

The machine-readable medium 216 may store instructions 224 executable by the processing resource 214 to assign a plurality of frames to the WLAN interface and the mmWave interface based at least in part on the estimated available WLAN bandwidth and the available mmWave. Frames may be assigned, by the sending device, to the WLAN interface and the mmWave interface based on the available throughput of the WLAN link and the mmWave link.

The frame buffer can be continuously monitored to ensure both the WLAN interface and the mmWave interface are utilized. In some instances, if either the WLAN link or the mmWave link becomes under-utilized, the assignment of the frames may be adjusted. In response to a determination that either the WLAN link or the mmWave link is being under-utilized, the plurality of frames may be reassigned so that both the WLAN interface and the mmWave interface are utilized.

The machine-readable medium 216 may store instructions 224 executable by the processing resource 214 to send the plurality of frames in a sequence via an aggregate interface to a receiving device, wherein the aggregate interface includes the WLAN interface and the mmWave interface. As described herein, the aggregate interface bundles multiple interfaces, such as the mmWave interface and the WLAN interface, into a single interface for redundancy and bandwidth aggregation.

The sending device may assign a shim header to each of the plurality of frames between an internet protocol (IP) and media access control (MAC) header. The shim header can include a 16-bit sequence number field. The sequence number may be maintained by a bonding driver of a transmitter, which may encapsulate the sequence number header to each of the plurality of frames. The sequence number assigned to each frame sent by the sending device may correspond to the sequence that the plurality of frames is sent by the sending device.

Figure 3:
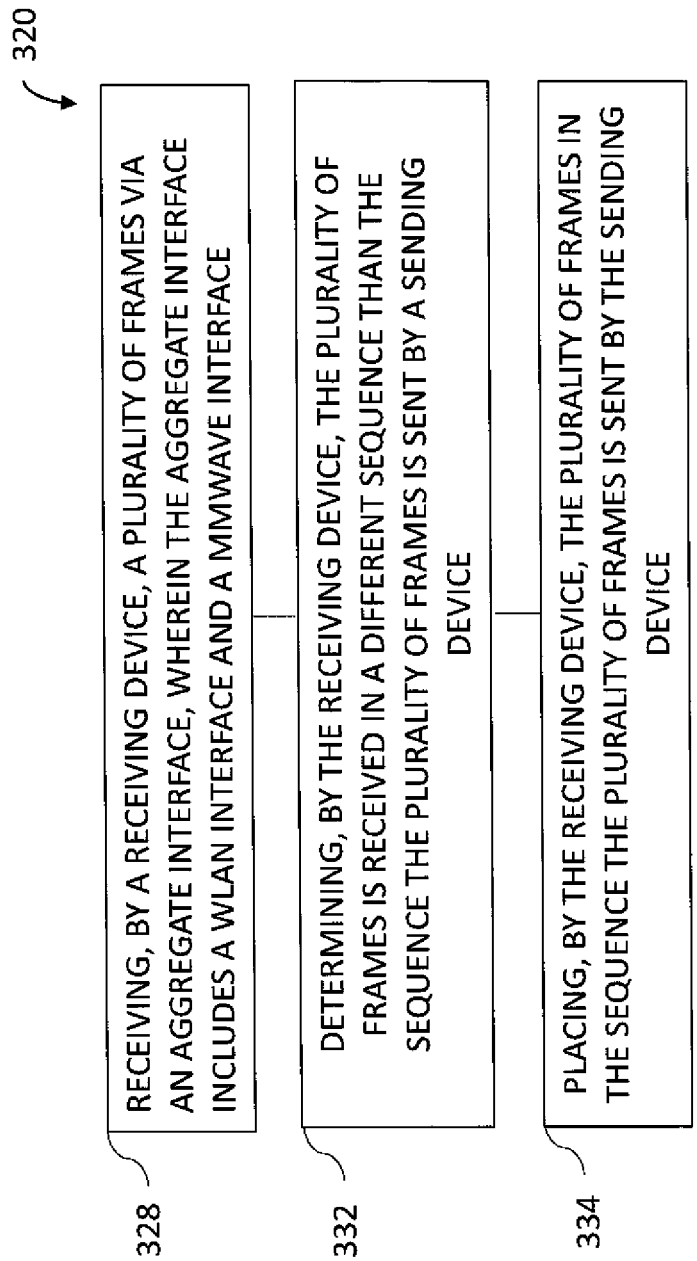
FIG. 3 illustrates an example of a method for an aggregate interface including a mmWave interface and a WLAN interface consistent with the disclosure.

FIG. 3 illustrates a flow diagram of an example of a method 320 for an aggregate interface including a mmWave interface and a WLAN interface consistent with the disclosure. The method 320 is not limited to a particular example described herein and may include additional features such as those described in system 100 described in FIG. 1 and the non-transitory machine-readable storage medium 210 described in FIG. 2.

At 328, the method 320 may include receiving, by a receiving device, a plurality of frames via an aggregate interface, wherein the aggregate interface includes a WLAN interface and a mmWave interface. As described herein, the receiving device may receive the plurality of frames sent by the sending device. The sending device and the receiving device may be communicatively coupled. The plurality of frames may be received by a bonding driver within the receiving device.

At 332, the method 320 may include determining, by the receiving device, the plurality of frames is received in a different sequence than the sequence the plurality of frames is sent by a sending device. As described herein, transmitting frames via the mmWave interface and the WLAN interface simultaneously can result in an out-of-order delivery of frames from the sending device to the receiving device due to the mmWave transmission being faster than the WLAN transmission.

The bonding driver within the receiving device may determine whether the plurality of frames is received in a different sequence than the sequence of the plurality of frames is sent by the sending device. For instance, if the bonding driver determines, based on the sequence number, that a frame is missing, the bonding driver may store the plurality of received frames until the missing frame is delivered. Each frame subsequent to the missing frame is stored by a buffer within the bonding driver. The buffer may re-order the sequence of the plurality of stored frames to ensure the plurality of frames is in the sequence sent by the sending device.

At 334, the method 320 may include placing, by the receiving device, the plurality of frames in the sequence the plurality of frames is sent by the sending device. As described herein, given the sequence of the plurality of frames, if the receiving device determines that a frame is missing, each frame subsequent to the missing frame is stored by the buffer within the bonding driver. The buffer may re-order the plurality of stored frames. For example, the buffer may place the plurality of stored frames in the sequence the plurality of frames is sent by the sending device. Additionally, the may detect the sequence the plurality of frames is sent by the sender based on the sequence number each of the plurality of frames is assigned.

In response to receiving the missing frame, the buffer may send the plurality of frames in the sequence the plurality of frames is sent by the sending device to the upper layer of the receiving device. For instance, the buffer may send the missing frame and the plurality of stored frames to the upper layer of receiving device in the sequence that the plurality of frames is sent by the sending device.

In the foregoing detailed description of the disclosure, reference is made to the accompanying drawings that form a part hereof, and in which is shown by way of illustration how examples of the disclosure may be practiced. These examples are described in sufficient detail to allow those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the disclosure. In addition, the proportion and the relative scale of the elements provided in the figures are intended to illustrate the examples of the disclosure and should not be taken in a limiting sense.

What is claimed:

1. A system comprising:
   a sending device to:
      monitor available bandwidth of a wireless local area network (WLAN) interface;
      monitor available bandwidth of a millimeter-wave (mmWave) interface separately from monitoring the bandwidth of the WLAN interface;
      assign a first plurality of frames to the WLAN interface and to the mmWave interface, wherein assignment of frames to the WLAN interface and the mmWave interface are based on available throughput of a corresponding WLAN link and available throughput of a corresponding mmWave link; and
      send the plurality of frames in a sequence via an aggregate interface, wherein the aggregate interface includes the WLAN interface and the mmWave interface
      dynamically adjust assignment of a second plurality of frames to the WLAN interface and to the mmWave interface based on subsequent monitoring of available bandwidth of the WLAN interface and subsequent monitoring of available bandwidth of the mmWave interface; and
   a receiving device communicatively coupled to the sending device to:
      determine the plurality of frames is received in a different sequence than the sequence the plurality of frames is sent by the sending device; and
      place the plurality of frames in the sequence the plurality of frames is sent by the sending device.

2. The system of claim 1, wherein assigning the plurality of frames to the WLAN interface and mmWave interface comprises:
   estimating an available WLAN bandwidth and an available mmWave bandwidth; and
   allocating frames to the WLAN interface and to the mmWave interface in approximate proportion to the available WLAN bandwidth and the available mmWave bandwidth.

3. The system of claim 2, further comprising reallocating the plurality of frames to the WLAN interface and the mmWave interface based on subsequently estimated available WLAN bandwidth and subsequently estimated available mmWave bandwidth.

4. The system of claim 1, wherein at least one of the plurality of frames is assigned to the WLAN interface and at least one of the plurality of frames is assigned to the mmWave interface.

5. The system of claim 1, wherein the sending device is an access point (AP).

6. The system of claim 1, wherein the receiving device is a client device.

7. The system of claim 1, further comprising the receiving device to store at least one of the plurality of frames in response to determining the plurality of frames is received in a different sequence by the receiving device than the sequence the plurality of frames is sent by the sending device.

8. The system of claim 7, further comprising the receiving device to deliver the plurality of frames to an upper layer in response to placing the plurality of stored frames in the sequence the plurality of frames is sent by the sending device.

9. The system of claim 8, further comprising the sending device to assign a shim header to each of the plurality of frames between an internet protocol and media access control header, and wherein the shim header includes a 16-bit sequence number.

10. A non-transitory machine-readable storage medium having stored thereon machine-readable instructions executable to cause a processor to:
    monitor available bandwidth of a wireless local area network (WLAN) interface;

monitor available bandwidth of a millimeter-wave (mmWave) interface separately from monitoring the bandwidth of the WLAN interface;

estimate an available WLAN bandwidth and an available mmWave bandwidth;

assign a first portion of a first plurality of frames to the WLAN interface and a second portion of the first plurality of frames to the mmWave interface based at least in part on the estimated available WLAN bandwidth and the available mmWave bandwidth, wherein the frames are assigned in approximate proportion to the available WLAN bandwidth and the available mmWave bandwidth;

send the plurality of frames in a sequence via an aggregate interface to a receiving device, wherein the aggregate interface includes the WLAN interface and the mmWave interface; and dynamically adjust assignment of a second plurality of frames to the WLAN interface and to the mmWave interface based on subsequent monitoring of available bandwidth of the WLAN interface and subsequent monitoring of available bandwidth of the mmWave interface.

11. The medium of claim 10, further comprising the processor to assign a sequence number to each of the plurality of frames based on the sequence the plurality of frames is sent to the receiving device.

12. The medium of claim 10, further comprising the processor to estimate the available WLAN bandwidth and the available mmWave bandwidth based on a determination whether the WLAN link or the mmWave link is saturated.

13. The medium of claim 10, further comprising the processor to estimate the available WLAN bandwidth and the available mmWave bandwidth based on monitoring of a first buffer length of the WLAN interface and a second buffer length of the mmWave interface.

14. The medium of claim 11, further comprising the processor to assign the plurality of frames to the WLAN interface and the mmWave interface based on a determination of the available throughput of the WLAN link and the available mmWave link.

15. The medium of claim 12, wherein the plurality of frames is assigned to the WLAN interface and the mmWave interface based on the available throughput of the WLAN link and the available mmWave link.

16. A wireless network device comprising:
a wireless local area network (WLAN) interface to transmit and receive data according to a first communication protocol;
a millimeter-wave (mmWave) interface to transmit and receive data according to a second communication protocol;
a hardware processing device communicatively coupled with the WLAN interface and with the mmWave interface, the hardware processing device to:
monitor available bandwidth of the WLAN interface;
monitor available bandwidth of the mmWave interface separately from monitoring the bandwidth of the WLAN interface;
assign a first portion of a first plurality of frames to the WLAN interface and a second portion of the first plurality of frames to the mmWave interface, wherein assignment of frames to the WLAN interface and the mmWave interface are based on available throughput of a corresponding WLAN link and available throughput of a corresponding mmWave link; and
send the plurality of frames in a sequence via an aggregate interface, wherein the aggregate interface includes the WLAN interface and the mmWave interface
dynamically adjust assignment of a second plurality of frames to the WLAN interface and to the mmWave interface based on subsequent monitoring of available bandwidth of the WLAN interface and subsequent monitoring of available bandwidth of the mmWave interface.

17. The wireless network device of claim 16, wherein assigning the plurality of frames to the WLAN interface and mmWave interface comprises:
estimating an available WLAN bandwidth and an available mmWave bandwidth; and
allocating frames to the WLAN interface and to the mmWave interface in approximate proportion to the available WLAN bandwidth and the available mmWave bandwidth.

18. The wireless network device of claim 16, wherein at least one of the second plurality of frames is assigned to the WLAN interface and at least one of the plurality of frames is assigned to the mmWave interface.

19. The wireless network device of claim 16, wherein the wireless network device comprises an access point (AP).

20. The wireless network device of claim 16, the hardware processing device further to estimate the available WLAN bandwidth and the available mmWave bandwidth based on monitoring of a first buffer length of the WLAN interface and a second buffer length of the mmWave interface.

* * * * *